(12) United States Patent
Liu et al.

(10) Patent No.: US 11,485,685 B2
(45) Date of Patent: Nov. 1, 2022

(54) INORGANIC FIBER TOUGHENED INORGANIC COMPOSITE ARTIFICIAL STONE PANEL AND PREPARATION METHOD THEREOF

(71) Applicant: GuangDong TopNice New Materials Technology CO., LTD., Guangdong (CN)

(72) Inventors: Fucai Liu, Guangdong (CN); Min Xiao, Guangdong (CN); Bin Li, Guangdong (CN); Zengyong Zheng, Guangdong (CN); Herning Huang, Guangdong (CN)

(73) Assignee: GUANGDONG TOPNICE NEW MATERIALS TECHNOLOGY CO., LTD., Guangdong (CN)

( * ) Notice: Subject to any disclaimer, the term of this patent is extended or adjusted under 35 U.S.C. 154(b) by 30 days.

(21) Appl. No.: 16/933,429

(22) Filed: Jul. 20, 2020

(65) Prior Publication Data
US 2021/0017080 A1    Jan. 21, 2021

(30) Foreign Application Priority Data

Jul. 19, 2019   (CN) .......................... 201910657355.0

(51) Int. Cl.
*C04B 14/06* (2006.01)
*C04B 28/04* (2006.01)
(Continued)

(52) U.S. Cl.
CPC .............. *C04B 28/04* (2013.01); *B28B 1/522* (2013.01); *B28B 3/006* (2013.01);
(Continued)

(58) Field of Classification Search
CPC ......... C01B 14/06; C01B 14/36; C01B 14/38; B32B 9/002; B32B 13/02; B32B 13/04; C04B 14/06; C04B 14/36; C04B 14/38
(Continued)

(56) References Cited

U.S. PATENT DOCUMENTS 3,949,144 A * 4/1976 Duff .......................... E04C 2/26
428/414
4,588,443 A * 5/1986 Bache ................. B28B 23/0081
106/676
(Continued)

FOREIGN PATENT DOCUMENTS

| CN | 102557542 A | 7/2012 |
| CN | 102898070 A | 1/2013 |

(Continued)

OTHER PUBLICATIONS

Allahverdi et al., Effect of Polyvinyl Alcohol on Flexural Strength and Some Important Physical Properties of Portland Cement Paste, Iranian Journal of Materials Science & Engineering vol. 7, No. 1, Winter 2010 (Year: 2010).*
(Continued)

*Primary Examiner* — Hoa (Holly) Le
(74) *Attorney, Agent, or Firm* — Muncy, Geissler, Olds & Lowe, P.C.

(57) ABSTRACT

An inorganic fiber toughened inorganic composite artificial stone panel and a preparation method thereof are disclosed. The panel includes a surface layer and a toughened base layer. The surface layer includes the the following components in parts by weight: 40-70 parts of quartz sand, 10-30 parts of quartz powder, 20-45 parts of inorganic active powder, 0.5-4 parts of pigment, 0.3-1 parts of water reducing agent and 3-10 parts of water. The toughened base layer includes the following components in parts by weight: 40-60 parts of inorganic active powder, 45-65 parts of sand, 0.8-1.5

(Continued)

parts of water reducing agent, 6-14 parts of water, 0.4-2 parts of inorganic fiber and 0.8-2.5 parts of toughener.

20 Claims, 1 Drawing Sheet

(51) Int. Cl.
| | |
|---|---|
| B28B 1/52 | (2006.01) |
| B28B 3/00 | (2006.01) |
| B28B 11/08 | (2006.01) |
| B28B 11/24 | (2006.01) |
| C04B 14/38 | (2006.01) |
| C04B 14/42 | (2006.01) |
| C04B 14/46 | (2006.01) |
| C04B 24/26 | (2006.01) |
| C04B 40/00 | (2006.01) |
| C04B 103/30 | (2006.01) |
| C04B 111/00 | (2006.01) |

(52) U.S. Cl.
CPC ......... *B28B 11/0845* (2013.01); *B28B 11/24* (2013.01); *C04B 14/06* (2013.01); *C04B 14/068* (2013.01); *C04B 14/386* (2013.01); *C04B 14/42* (2013.01); *C04B 14/4625* (2013.01); *C04B 14/4668* (2013.01); *C04B 24/2623* (2013.01); *C04B 24/2652* (2013.01); *C04B 40/0071* (2013.01); *C04B 40/0082* (2013.01); *C04B 40/0089* (2013.01); *C04B 2103/302* (2013.01); *C04B 2111/00612* (2013.01); *C04B 2201/50* (2013.01)

(58) Field of Classification Search
USPC .................................................. 428/323–326
See application file for complete search history.

(56) References Cited

U.S. PATENT DOCUMENTS

| | | | | |
|---|---|---|---|---|
| 4,902,347 | A * | 2/1990 | Soroushian | C04B 20/1066 524/5 |
| 5,225,237 | A * | 7/1993 | Magnani | B28B 1/522 442/57 |
| 5,803,964 | A * | 9/1998 | Scarborough | E04B 1/161 106/724 |
| 11,325,864 | B2 * | 5/2022 | Liu | B32B 13/02 |
| 2004/0035329 | A1 * | 2/2004 | Sullivan | C04B 41/009 106/709 |
| 2021/0017079 | A1 * | 1/2021 | Liu | C04B 14/06 |

FOREIGN PATENT DOCUMENTS

| | | |
|---|---|---|
| CN | 106630805 A | 5/2017 |
| CN | 107140877 A | 9/2017 |
| CN | 107311592 A | 11/2017 |
| CN | 107673653 A | 2/2018 |
| CN | 107698194 A | 2/2018 |
| CN | 109354468 A | 2/2019 |
| JP | H-06239654 A | 8/1994 |
| JP | 2004-031525 A | 1/2004 |

OTHER PUBLICATIONS

Barabanshchikov, Strength and Deformability of Fiber Reinforced Cement Paste on the Basis of Basalt Fiber, Advances in Civil Engineering, vol. 2016, Article ID 6562526, 5 pages http://dx.doi.org/10.1155/2016/6562526 (Year: 2016).*

Zhang et al., Effect of Hybrid Steel-Basalt Fiber on Behaviors of Manufactured Sand RPC and Fiber Content Optimization Using Center Composite Design, Advances in Civil Engineering, vol. 2020, Article ID 8877750, 17 pages https://doi.org/10.1155/2020/8877750 (Year: 2020).*

* cited by examiner

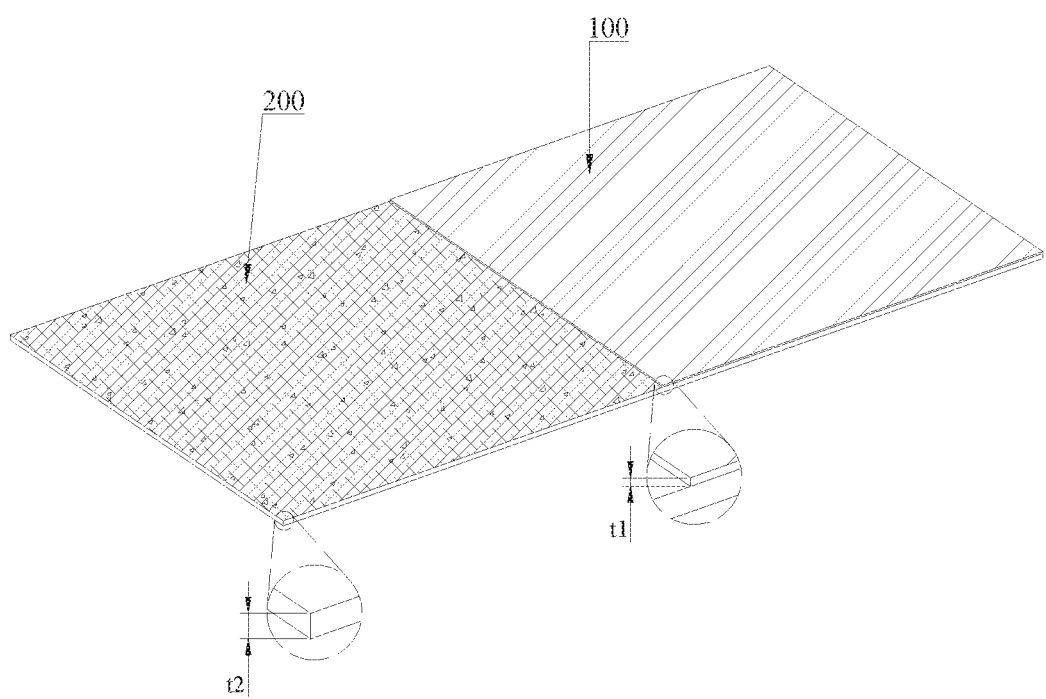

INORGANIC FIBER TOUGHENED INORGANIC COMPOSITE ARTIFICIAL STONE PANEL AND PREPARATION METHOD THEREOF

CROSS REFERENCE TO THE RELATED APPLICATIONS

This application is based upon and claims priority to Chinese Patent Application No. 201910657355.0, filed on Jul. 19, 2019, the entire contents of which are incorporated herein by reference.

TECHNICAL FIELD

The invention relates to the technical field of processing artificial stone, in particular to an inorganic fiber toughened inorganic composite artificial stone panel and a preparation method thereof.

BACKGROUND ART

With the reinforcement of ecological environmental protection in China, the mining of natural stone is strictly controlled. On the other hand, China's infrastructure, such as airports, subway stations, high-speed rail stations, commercial squares and hall centers, is still under construction. A large number of infrastructures have high demands for the artificial stone panel material, and the artificial stone replacing the natural stone has a broad market prospect.

The traditional artificial stone is mainly composed of resin-type organic artificial stone and a small amount of inorganic artificial stone. The resin-type artificial stone mainly has the disadvantages of large thermal deformation, being easy to expand, deform and crack, causing aging deformation, discoloration and intensity reduction because of ultraviolet radiation and temperature influence, giving off unpleasant smell when burned, non-degradation and short service life and the like, and has been gradually subjected to environmental restrictions and limited use. The novel inorganic artificial stone panel is mainly a traditional cement-based terrazzo-type product, has the advantages of low compressive strength, poor hardness, low bending strength, high brittleness and easy embrittlement, high overall water absorption, poor stain resistance and chemical resistance, has difficulty in achieving the performance of natural stone, and is unsafe to use since the panel is easily fractured.

Currently, inorganic artificial stone has a brittle structure, low bending resistance and easy embrittlement. The artificial stone panel mostly has a single-layer structure, and the bottom directly cracks to generate brittle fracture once the structure is subjected to external force, so that the structure is low in ductility and the product is directly damaged. Therefore, the structure was locally improved by adding a metal mesh or fiber mesh reinforcement structure (e.g., CN106630805A) to the middle part. However, although the reinforcement mesh has a certain tensile strength to slow down the crack development when the ductile deformation is increased, the crack penetrates the fiber mesh and continues to expand with the increase of intensity since the brittle surface of the bottom bends and deforms to generate brittle fracture under the pressure, so that the structure may also be damaged and cannot effectively overcome the situation of structural failure fracture. In addition, the structure adopts the method in which the surface layer was directly combined with the fiber base layer to form the toughened panel in order to overcome the problem of being easy to deform and crack of the surface layer under pressure (e.g., CN109354468A). Due to the introduction of the fiber base layer into the processing of artificial stone panel, surface fiber exposure and fiber channel opening are formed in the bottom scraping process, the water absorption performance of the panel structure was greatly improved, and corrosion damage and metal corrosion stain are very easy to occur if metal fiber was used. Meanwhile, the surface water absorption was greatly improved if organic fiber was used, and the uneven expansion and contraction causes the fiber surface and the artificial stone hydration interface to form a channel, so that the mechanical properties and durability of the panel can be reduced.

SUMMARY OF THE INVENTION

In view of above, the present invention provides an inorganic fiber toughened inorganic composite artificial stone panel which has high strength, stain resistance, high toughness, long service life, aging resistance, and economic rationality and basically the same thermal expansion coefficient as artificial stone base material by using the inorganic fiber, thereby overcoming the defects of existing traditional inorganic artificial stone technology products of insufficient compressive resistance, low bending strength and toughness, and high water absorption and the like.

According to the present invention, the inorganic fiber toughened inorganic composite artificial stone panel includes a surface layer and a toughened base layer, in which the surface layer includes materials having the following components in parts by weight: 40-70 parts of quartz sand, 10-30 parts of quartz powder, 20-45 parts of inorganic active powder, 0.5-4 parts of pigment, 0.3-1 parts of water reducing agent and 3-10 parts of water; and the toughened base layer includes materials having the following components in parts by weight: 40-60 parts of inorganic active powder, 45-65 parts of sand, 0.8-1.5 parts of water reducing agent, 6-14 parts of water, 0.4-2 parts of inorganic fiber and 0.8-2.5 parts of toughener.

Further, the fineness modulus of the quartz sand is 2.0-3.0, the silicon dioxide content is more than 93%, no impurity and weathering is contained, and the hardness of the raw stone is above 7.

Further, the fineness of the quartz powder is more than 600 mesh, the silicon dioxide content is more than 93%, and the hardness of the raw stone is above 7. The central role of the quartz powder in the present invention is to improve the abrasion resistance and the scratch resistance of the gelling powder hydration products, except the aggregate, on the surface of artificial stone after mixing, and to improve the surface density performance.

Further, the inorganic active powder takes pure white Portland cement as the main body which has a strength grade of above 42.5, and is mixed with one or more active powders among white silicon powder, mineral powder, nano calcium oxide, nano silicon dioxide and sintered high white kaolin clay powder. The active powder has a single color of white, the whiteness index exceeds 80%, the activity index detection is greater than 100%, so that the material strength is guaranteed and the subsequent color adjustment has good stability. The proportion of cement to other active powders is 1: (0.2 to 0.6).

Further, the pigment is inorganic pigment in all colors.

Further, the water reducing agent is free of metal ion color and has a concentration of no more than 20%, the water reducing rate is more than 20%, and the retarding time is 0.5 to 1 hour.

Further, the sand is selected from one or more of river sand, manufactured sand and quartz sand, and requires that no mud, mud block and organic shellfish is contained. The solid mass loss of material is not more than 8%, the maximum particle diameter is not more than 2.5 mm, and the fineness modulus is less than 3.0 or greater than 2.0.

Further, the inorganic fiber is selected from one or more of glass fiber, carbon fiber, basalt fiber, boron fiber, ceramic fiber and alumina fiber which have a diameter of 0.02 to 0.08 mm, a length of 6 to 12 mm and a tensile strength of more than 1,000 MPa.

Further, the toughener is selected from one or more latex solutions of polyvinyl alcohol glue and acrylamide glue and the like.

Further, the total thickness of the panel is 15 to 50 mm, and the thickness of the surface layer is 4 to 6 mm.

Another object of the present invention is to provide a preparation method of the inorganic fiber toughened inorganic composite artificial stone panel, including the following steps:

S1, uniformly stirring and mixing the raw materials used for the surface layer and the toughened base layer to obtain a mixture for all layers for later use;

S2, preparing a panel mold, calculating according to thickness and measuring the surface layer mixture prepared in step S1 and uniformly distributing the mixture in the panel mold, calculating according to the thickness and measuring the toughened base layer mixture prepared in the step S1 and uniformly distributing the mixture on the surface layer mixture in the panel mold;

S3, covering an isolated moisturizing film on the toughened base layer mixture in the panel mold of step S2, and then putting the panel mold into a vacuum compressor to concurrently perform a vacuum exhaust and a vibrating compression to obtain a compressed plate;

S4, curing the compressed plate obtained in step S3 at 40° C. for 6-8 hours, then heating the compressed plate to 80-90° C. and curing the compressed plate at 80-90° C. for 12-16 hours, and obtaining a rough plate; and S5, performing a bottom scraping, a thickening and a polishing on the rough plate obtained in step S4 after removing the isolation moisturizing film to obtain the inorganic fiber toughened inorganic composite artificial stone panel.

The respective stirring and mixing periods of time in the step S1 is not less than 10 minutes, and the Vebe consistency testing time of the working performance of the stirring material is 5 to 30s; and the initial setting time after stirring and mixing is not less than 60 minutes.

In step S3, time for the vacuum exhaust is not less than 60 seconds, time for the vibrating compression is not less than 120 seconds; and a vacuum pressure for the vacuum exhaust is −0.07-0.1 MPa, a pressure load of the vacuum compressor is not less than 1 MPa, and a pressure of the vacuum compressor is not less than 5000 kN.

In step S4, the humidity is kept above 75% during the curing at 80-90° C.

The process solves the phenomenon of interface adhesive strength being separated under pressure by means of layered and successive distribution of materials for concentrated pressing, so that the materials among layers have a certain mutual intersection and meshing with each other; improves the pressing pressure compared with the traditional vacuum process for manufacturing inorganic stone; shortens the vacuumizing time; improves the density and the manufacturing efficiency of the artificial stone; and reduces the water absorption of the panel surface. By adjusting the temperature, moisturizing and curing in stages, the use efficiency of the early-stage mold is improved, the volume of the artificial stone panel is more stable at the same time, followed by that the shrinkage performance is completely overcome, and the consistency of strength is guaranteed to be stable.

Compared with the prior art, the inorganic fiber toughened inorganic composite artificial stone panel described in the present invention has the advantages of high strength, high bending resistance, low brittleness, impact resistance, crack resistance, good anti-seismic performance and the like; is stable in volume, low in shrinkage, free of warpage deformation in use, low in water absorption, good in durability performance, free of problems like aging, high in structural safety, good in ductility without instantaneous brittle fracture, capable of serving as carrying capacity structure, good in surface stain resistance, wide in material sources, low in integrated comprehensive cost and suitable for popularization and use.

BRIEF DESCRIPTION OF THE DRAWINGS

The Sole FIGURE is a schematic diagram showing a structure of an inorganic fiber toughened inorganic composite artificial stone panel.

Illustration of reference signs: surface layer 100 and toughened base layer 200.

EMBODIMENTS

The drawings are for illustration purpose only and are not intended to limit the present invention. Some components in the drawings are omitted, enlarged or reduced for better illustrating the embodiments, and sizes of these components do not represent that of actual products. For those skilled in the art, it will be understood that some known structures in the drawings and descriptions thereof may be omitted. The description of positional relationship in the drawings is for illustration purpose only and is not intended to limit the present invention. The present invention will be further illustrated below with reference to specific embodiments.

Embodiment 1

As shown in the sole FIGURE, the overall thickness (t1+t2) of an inorganic fiber toughened inorganic composite artificial stone panel is 15 to 50 mm, including a surface layer with a thickness t1 of 4 to 6 mm and a toughened base layer with a thickness t2, in which the surface layer includes materials having the following components in parts by weight: quartz sand of 40 parts by weight, quartz powder of 10 parts by weight, inorganic active powder of 20 parts by weight, pigment of 0.5 part by weight, water reducing agent of 0.3 part by weight and water of 3 parts by weight; and the toughened base layer includes materials having the following components in parts by weight: inorganic active powder of 40 parts by weight, sand of 45 parts by weight, water reducing agent of 0.8 part by weight, water of 6 parts by weight, inorganic fiber of 0.4 part by weight and toughener of 0.8 part by weight.

The fineness modulus of the quartz sand is 2.3 (the fineness modulus of the quartz sand can be 2.0 to 3.0, and Embodiment 1 chooses 2.3), the silicon dioxide content is more than 93%, no impurity and weathering is contained, and the hardness of the raw stone is above 7.

The fineness of the quartz powder is more than 600 meshes, the silicon dioxide content is more than 93%, and the hardness of the raw stone is above 7.

The inorganic active powder takes white cement of P.O 42.5 as the main body mixed with white silicon powder (one or more active powders among white silicon powder, mineral powder, nano calcium oxide, nano silicon dioxide and sintered high white kaolin clay powder can be added herein).

The pigment is inorganic pigment in all colors.

The water reducing agent is free of metal ion color and has a concentration of no more than 20%, the water reducing rate is more than 20%, and the retarding time is 0.5 to 1 hour.

The sand is river sand (can be selected from one or more of river sand, manufactured sand and quartz sand), and requires that no mud, mud block and organic shellfish is contained. The solid mass loss of material is no more than 8%, the maximum particle diameter is no more than 2.5 mm, and the fineness modulus is 2.6.

The inorganic fiber is basalt fiber having a diameter of 0.02 mm, a length of 6 mm and a tensile strength of more than 1,000 MPa (the inorganic fiber is selected from one or more of glass fiber, carbon fiber, basalt fiber, boron fiber, ceramic fiber and alumina fiber which have a diameter of 0.02 to 0.08 mm, a length of 6 to 12 mm and a tensile strength of more than 1,000 MPa).

The toughener is polyvinyl alcohol glue and acrylamide glue.

The preparation method of the inorganic fiber toughened inorganic composite artificial stone panel includes the following steps:

S1, uniformly stirring and mixing the raw materials used for the surface layer and the toughened base layer respectively for no less than 10 minutes, the Vebe consistency testing time of the working performance of the stirring material is 5 to 30 seconds, and the initial setting time after stirring and mixing is no less than 60 minutes to obtain a mixture of all layers for later use;

S2, preparing a panel mold, calculating according to thickness and measuring the surface layer mixture prepared in step S1 and uniformly distributing the mixture in the panel mold, calculating according to the thickness and measuring the toughened base layer mixture prepared in step S1 and uniformly distributing the mixture on the surface layer mixture in the panel mold;

S3, covering an isolated moisturizing film on the toughened base layer mixture in the panel mold of step S2, then putting the panel mold into a vacuum compressor to concurrently perform a vacuum exhaust and a vibrating compression to obtain a compressed plate. time for the vacuum exhaust is not less than 60 seconds, time for the vibrating compression is not less than 120 seconds; and the vacuum pressure is −0.07 to −0.1 MPa, the pressure load of the compressor is no less than 1 MPa, and the pressure is no less than 5,000 kN;

S4, curing compressed plate obtained in step S3 at 40° C. for 6 to 8 hours, then heating compressed plate to 80 to 90° C. and curing the compressed plate at 80-90° C. for 12-16 hours, and obtaining a rough plate, and the humidity is kept above 75% during the curing; and S5, performing a bottom scraping, a thickening and a polishing on the rough plate obtained in step S4 after removing the isolation moisturizing film to obtain the inorganic fiber toughened inorganic composite artificial stone panel.

Embodiment 2

Other conditions are the same as in Embodiment 1 except that the formula of the inorganic fiber toughened inorganic composite artificial stone panel is different.

The inorganic fiber toughened inorganic composite artificial stone panel includes the following materials in parts by weight. The surface layer includes materials having the following components in parts by weight: quartz sand of 70 parts by weight, quartz powder of 30 parts by weight, inorganic active powder of 45 parts by weight, pigment of 4 parts by weight, water reducing agent of 1 part by weight and water of 10 parts by weight; and the toughened base layer includes materials having the following components in parts by weight: inorganic active powder of 60 parts by weight, sand of 65 parts by weight, water reducing agent of 1.5 parts by weight, water of 14 parts by weight, inorganic fiber of 2 parts by weight and toughener of 2.5 parts by weight.

Embodiment 3

Other conditions are the same as in Embodiment 1 except that the formula of the inorganic fiber toughened inorganic composite artificial stone panel is different.

The inorganic fiber toughened inorganic composite artificial stone panel includes the following materials in parts by weight. The surface layer includes materials having the following components in parts by weight: quartz sand of 50 parts by weight, quartz powder of 15 parts by weight, inorganic active powder of 26 parts by weight, pigment of 1.5 parts by weight, water reducing agent of 0.5 part by weight and water of 5 parts by weight; and the toughened base layer includes materials having the following components in parts by weight: inorganic active powder of 45 parts by weight, sand of 50 parts by weight, water reducing agent of 1 part by weight, water of 8 parts by weight, inorganic fiber of 0.8 part by weight and toughener of 1.2 parts by weight.

Embodiment 4

Other conditions are the same as in Embodiment 1 except that the formula of the inorganic fiber toughened inorganic composite artificial stone panel is different.

The inorganic fiber toughened inorganic composite artificial stone panel includes the following materials in parts by weight. The surface layer includes materials having the following components in parts by weight: quartz sand of 60 parts by weight, quartz powder of 25 parts by weight, inorganic active powder of 39 parts by weight, pigment of 3 parts by weight, water reducing agent of 0.8 part by weight and water of 8 parts by weight; and the toughened base layer includes materials having the following components in parts by weight: inorganic active powder of 55 parts by weight, sand of 60 parts by weight, water reducing agent of 1.3 parts by weight, water of 12 parts by weight, inorganic fiber of 1.6 parts by weight and toughener of 2.1 parts by weight.

Embodiment 5

Other conditions are the same as in Embodiment 1 except that the formula of the inorganic fiber toughened inorganic composite artificial stone panel is different.

The inorganic fiber toughened inorganic composite artificial stone panel includes the following materials in parts by weight. The surface layer includes materials having the following components in parts by weight: quartz sand of 55 parts by weight, quartz powder of 20 parts by weight, inorganic active powder of 32.5 parts by weight, pigment of 2.25 parts by weight, water reducing agent of 0.65 part by weight and water of 6.5 parts by weight; and the toughened base layer includes materials having the following components in parts by weight: inorganic active powder of 50 parts by weight, sand of 55 parts by weight, water reducing agent of 1.15 parts by weight, water of 10 parts by weight, inorganic fiber of 1.2 parts by weight and toughener of 1.65 parts by weight.

Comparative Example 1

Other conditions are the same as in Embodiment 1 except that the toughened base layer does not contain toughener.
Comparative Example 2

Other conditions are the same as in Embodiment 1 except that the toughened base layer does not contain inorganic fiber.

Comparative Example 3

Common resin artificial stone.

The inorganic fiber toughened inorganic composite artificial stone panels prepared by the above Embodiments 1 to 5 and Comparative Examples 1 to 3 are manufactured into standard test pieces for performance testing, and the test results are shown in Table 1.

TABLE 1

| | Performance detection results for inorganic decorative panels | | | | | |
|---|---|---|---|---|---|---|
| Items | Compressive Strength (MPa) | Bending Strength (MPa) | Impact Resistance Performance | Mohs Hardness | Abrasion Resistance Performance ($mm^3$) | Stain Resistance Performance (16 hours after dripping red wine, coffee, rice vinegar and soy sauce) |
| Embodiment 1 | 152.5 | 26.2 | No damage | 7 | 139 | Scrubbable surface with small amount of residue |
| Embodiment 2 | 156.1 | 27.5 | No damage | 8 | 116 | Scrubbable surface with small amount of residue |
| Embodiment 3 | 157.9 | 28.3 | No damage | 7 | 123 | Scrubbable surface with small amount of residue |
| Embodiment 4 | 159.5 | 29.1 | No damage | 8 | 116 | Scrubbable surface with small amount of residue |
| Embodiment 5 | 165.7 | 30.8 | No damage | 8 | 102 | Scrubbable surface with no residue |
| Comparative Example 1 | 135.1 | 17.9 | Damage | 7 | 139 | Scrubbable surface with small amount of residue |
| Comparative Example 2 | 130.6 | 15.2 | Damage | 7 | 139 | Scrubbable surface with small amount of residue |
| Comparative Example 3 | 80.9 | 16.5 | Damage | 4 | 462 | Non-Scrubbable Surface |

As seen from Table 1, the toughened base layer in Comparative Example 1 does not contain toughener, and, compared to Embodiment 1, all of the compressive strength, the bending strength and the impact resistance performance decreased while the mohs hardness, the abrasion resistance performance and the stain resistance performance were basically the same; the toughened base layer in Comparative Example 2 does not contain inorganic fiber, and, compared to Embodiment 1, all of the compressive strength, the bending strength and the impact resistance performance decreased while the mohs hardness, the abrasion resistance performance and the stain resistance performance were basically the same; and, compared to Embodiment 1, all of the compressive strength, the bending strength, the impact resistance performance, the mohs hardness, the abrasion resistance performance and the stain resistance performance of the common resin artificial stone in Comparative Example 3 decreased.

Obviously, the above embodiments of the present invention are merely examples for clear illustration of the present invention, and are not intended to limit the implementations of the present invention. For those skilled in the art, modifications or changes in other forms can also be made on the basis of the above description. It is unnecessary and impossible to exhaust all implementations herein. Any modification, equivalent substitution, improvement or the like within the spirit and principle of the invention should be included in the scope of the claims of the present invention.

The invention claimed is:

1. An inorganic fiber toughened inorganic composite artificial stone panel, comprising a surface layer and a toughened base layer,
wherein the surface layer includes materials having the following components in parts by weight: 40-70 parts of quartz sand, 10-30 parts of quartz powder, 20-45 parts of an inorganic active powder, 0.5-4 parts of a pigment, 0.3-1 parts of a water reducing agent and 3-10 parts of water,
wherein the toughened base layer includes materials having the following components in parts by weight: 40-60 parts of the inorganic active powder, 45-65 parts of sand, 0.8-1.5 parts of the water reducing agent, 6-14 parts of water, 0.4-2 parts of an inorganic fiber and 0.8-2.5 parts of a toughener, and
wherein the inorganic active powder is mainly composed of pure white Portland cement doped with an active powder, the pure white Portland cement has a strength grade of more than 42.5, and the active powder is at least one selected from the group consisting of white silicon powder, mineral powder, nano calcium oxide, nano silicon oxide, and sintered high white kaolin powder.

2. The inorganic fiber toughened inorganic composite artificial stone panel according to claim 1, the quartz sand has a fineness modulus of 2.0-3.0, a content of silicon dioxide above 93%, and a hardness of a raw stone above 7.

3. The inorganic fiber toughened inorganic composite artificial stone panel according to claim 1, the quartz powder has a fineness of 600 mesh or more, a content of silicon dioxide above 93%, and a hardness of a raw stone above 7.

4. The inorganic fiber toughened inorganic composite artificial stone panel according to claim 1, wherein the sand is selected from one or more of river sand, manufactured sand and the quartz sand.

5. The inorganic fiber toughened inorganic composite artificial stone panel according to claim 1, wherein the inorganic fiber is selected from one or more of glass fiber, carbon fiber, basalt fiber, boron fiber, ceramic fiber and alumina fiber which have a diameter of 0.02-0.08 mm, a length of 6-12 mm and a tensile strength of more than 1,000 MPa.

6. The inorganic fiber toughened inorganic composite artificial stone panel according to claim 1, wherein the toughener is selected from one or more of polyvinyl alcohol glue and acrylamide glue.

7. The inorganic fiber toughened inorganic composite artificial stone panel according to claim 1, wherein a total thickness of the panel is 15-50 mm, and a thickness of the surface layer is 4-6 mm.

8. A preparation method of the inorganic fiber toughened inorganic composite artificial stone panel according to claim 1, comprising the steps of:
S1) uniformly stirring and mixing first raw materials and second raw materials, respectively, according to the predetermined ratio to obtain a first mixed material and a second mixed material, wherein the first raw materials are used for the surface layer and second raw materials are used for the toughened base layer;
S2) preparing a panel mold, calculating and weighing the first mixed material prepared in step S1 according to a thickness of the surface layer and uniformly arranging the first mixed material in the panel mold, then calculating and weighing the second mixed material prepared in step S1 according to a thickness of the toughened base layer and uniformly arranging the second mixed material on the first mixed material in the panel mold;
S3) covering an isolated moisturizing film on the second mixed material in the panel mold of step S2, and then putting the panel mold into a vacuum compressor to concurrently perform a vacuum exhaust and a vibrating compression to obtain a compressed plate;
S4) curing the compressed plate obtained in step S3 at a temperature of 40° C. for 6 to 8 hours, then heating the compressed plate to 80-90° C. and curing the compressed plate at 80-90° C. for 12-16 hours, and obtaining a rough plate; and
S5) performing a bottom scraping, a thickening and a polishing on the rough plate obtained in step S4 after removing the isolation moisturizing film to obtain the inorganic fiber toughened inorganic composite artificial stone panel.

9. The preparation method according to claim 8, wherein in step S1, time for stirring and mixing the first raw materials and second raw materials is not less than 10 minutes, respectively; Vebe consistency testing time of the first mixed material and the second mixed material is 5-30 seconds, respectively; and the initial setting time of the first mixed material and the second mixed material after the stirring and mixing is not less than 60 minutes.

10. The preparation method according to claim 8, wherein in step S3, time for the vacuum exhaust is not less than 60 seconds, time for the vibrating compression is not less than 120 seconds; and a vacuum pressure for the vacuum exhaust is −0.07-0.1 MPa, a pressure load of the vacuum compressor is not less than 1 MPa, and a pressure of the vacuum compressor is not less than 5000 kN.

11. The preparation method according to claim 8, wherein in step S4, a humidity is kept above 75% during the curing at 80-90° C.

12. The preparation method according to claim 8, the quartz sand has a fineness modulus of 2.0-3.0, a content of silicon dioxide above 93%, and a hardness of a raw stone above 7.

13. The preparation method according to claim 8, the quartz powder has a fineness of 600 mesh or more, a content of silicon dioxide above 93%, and a hardness of a raw stone above 7.

14. The preparation method according to claim 8, wherein the sand is selected from one or more of river sand, manufactured sand and the quartz sand.

15. The preparation method of the inorganic fiber toughened according to claim 8, the inorganic fiber is selected from one or more of glass fiber, carbon fiber, basalt fiber, boron fiber, ceramic fiber and alumina fiber which have a diameter of 0.02-0.08 mm, a length of 6-12 mm and a tensile strength of more than 1,000 MPa.

16. The preparation method of the inorganic fiber toughened according to claim 8, wherein the toughener is selected from one or more of polyvinyl alcohol glue and acrylamide glue.

17. The preparation method of the inorganic fiber toughened according to claim 8, wherein a total thickness of the panel is 15-50 mm, and a thickness of the surface layer is 4-6 mm.

18. An inorganic fiber toughened inorganic composite artificial stone panel, comprising a surface layer and a toughened base layer, wherein the surface layer includes materials having the following components in parts by weight: 40-70 parts of quartz sand, 10-30 parts of quartz powder, 20-45 parts of an inorganic active powder, 0.5-4 parts of a pigment, 0.3-1 parts of water reducing agent and 3-10 parts of water, wherein the toughened base layer includes materials having the following components in parts by weight: 40-60 parts of the inorganic active powder, 45-65 parts of sand, 0.8-1.5 parts of the water reducing agent, 6-14 parts of water, 0.4-2 parts of an inorganic fiber and 0.8-2.5 parts of a toughener, and wherein the quartz powder has a fineness of 600 mesh or more, a content of silicon dioxide above 93%, and a hardness of a raw stone above 7.

19. The inorganic fiber toughened according to claim 18, the quartz sand has a fineness modulus of 2.0-3.0, a content of silicon dioxide above 93%, and a hardness of a raw stone above 7.

20. The inorganic fiber toughened according to claim 18, wherein a total thickness of the panel is 15-50 mm, and a thickness of the surface layer is 4-6 mm.

\* \* \* \* \*